United States Patent
Ho et al.

(10) Patent No.: US 8,531,831 B2
(45) Date of Patent: *Sep. 10, 2013

(54) NOTEBOOK COMPUTER

(75) Inventors: Chia-Ju Ho, Taipei (TW); Chih-Chin Yu, Taipei (TW)

(73) Assignee: Inventec Corporation (TW)

( * ) Notice: Subject to any disclaimer, the term of this patent is extended or adjusted under 35 U.S.C. 154(b) by 317 days.

This patent is subject to a terminal disclaimer.

(21) Appl. No.: 12/982,358

(22) Filed: Dec. 30, 2010

(65) Prior Publication Data

US 2012/0120598 A1    May 17, 2012

(30) Foreign Application Priority Data

Nov. 16, 2010  (TW) ................................ 99139435 A

(51) Int. Cl.
*G06F 1/16* (2006.01)

(52) U.S. Cl.
USPC .................... 361/679.55; 362/248; 365/225.7; 248/309.1

(58) Field of Classification Search
USPC ................. 345/531, 212, 87, 690, 211, 698, 345/89, 78, 214, 100; 248/316.5, 425, 309.1; 362/85, 248; 361/679.27, 679.09, 679.55, 361/679.21, 679.02, 679.58, 679.06, 679.33, 361/679.41, 679.43, 679.23, 801; 365/185.03, 365/185.22, 185.18, 185.29, 222, 244, 189.05, 365/225.7; 439/352, 131; 312/223.2, 265.5
See application file for complete search history.

(56) References Cited

U.S. PATENT DOCUMENTS

| 5,666,261 A * | 9/1997 | Aguilera ................... 361/679.09 |
| 2012/0051029 A1* | 3/2012 | Huang et al. .................... 362/85 |

FOREIGN PATENT DOCUMENTS

| CN | 1988575 | 5/2007 |
| CN | 101625578 | 1/2010 |
| TW | M309705 | 4/2007 |
| TW | 200913849 | 3/2009 |
| TW | I324904 | 5/2010 |

OTHER PUBLICATIONS

Office Action dated Dec. 4, 2013 from corresponding application No. CN201010557898.4.

* cited by examiner

*Primary Examiner* — Hung Duong
(74) *Attorney, Agent, or Firm* — Lowe Hauptman & Ham, LLP

(57) ABSTRACT

A notebook computer comprises a first machinery, a first latch, a second machinery, a slider, an elastic element and a push element. The first latch is disposed on an edge of the first machinery. The second machinery has one side pivotally connected to the first machinery, and the other side formed with at least one latching hole. When the computer is closed, the first latch is inserted into the latching hole. The slider includes a body and a second latch. The body is slidably disposed in the second machinery along a first moving path. The second latch, disposed on the body, suits to latch or unlatch the first latch. The elastic element has one end connected to the slider, and the other end connected to the second machinery. The push element, slidably disposed in the second machinery along a second moving path, suits to push the body.

11 Claims, 6 Drawing Sheets

NOTEBOOK COMPUTER

This application claims the benefit of Taiwan application Serial No. 99139435, filed Nov. 16, 2010, the subject matter of which is incorporated herein by reference.

BACKGROUND OF THE INVENTION

1. Field of the Invention

The disclosure relates in general to a notebook computer, and more particularly to a cover-type notebook computer.

2. Description of the Related Art

In each of some conventional notebook computers, a latch structure is disposed between its first machinery and its second machinery, so that the first machinery cannot be easily rotated away from the second machinery when the notebook computer is being stored. In this case, the first machinery cannot be easily impacted and damaged by the ambient objects when the notebook computer is being transported. Especially in the notebook computer, a display tends to be disposed on the first machinery. Among the components constituting the display, panels each made of an ultra-thin glass sheet are even used. Thus, the notebook computer with the latch structure can prevent the display from being damaged. In the conventional latch structure, the moveable latch element is usually disposed in the first machinery. Such a design makes the structure of the first machinery become complicated.

SUMMARY OF THE INVENTION

The invention is directed to a notebook computer having a first machinery, a second machinery and a first latch and a corresponding latching hole, which are disposed between the first machinery and the second machinery.

According to a first aspect of the disclosure, a notebook computer including a first machinery, a first latch, a second machinery, a slider, an elastic element and a push element is provided. The first latch is disposed on an edge of the first machinery. The second machinery has one side pivotally connected to the first machinery, and the other side formed with at least one latching hole. When the first machinery and the second machinery are closed relative to each other, the latching hole corresponds to a position of the first latch, so that the first latch is inserted into the latching hole. The slider includes a body and a second latch. The body is slidably disposed in the second machinery along a first moving path. The second latch disposed on the body suits to latch the first latch or unlatch an interference with the first latch. The elastic element has one end connected to the slider, and the other end connected to the second machinery. The push element is slidably disposed in the second machinery along a second moving path, and suits to push the body. When the push element pushes the body of the slider, at least one portion of the body is moved away from the first moving path, so that the second latch is moved away from the first moving path to unlatch the interference between the second latch and the first latch.

The above and other aspects of the disclosure will become better understood with regard to the following detailed description of the embodiment(s). The following description is made with reference to the accompanying drawings.

DETAILED DESCRIPTION OF THE INVENTION

Figure 1A:
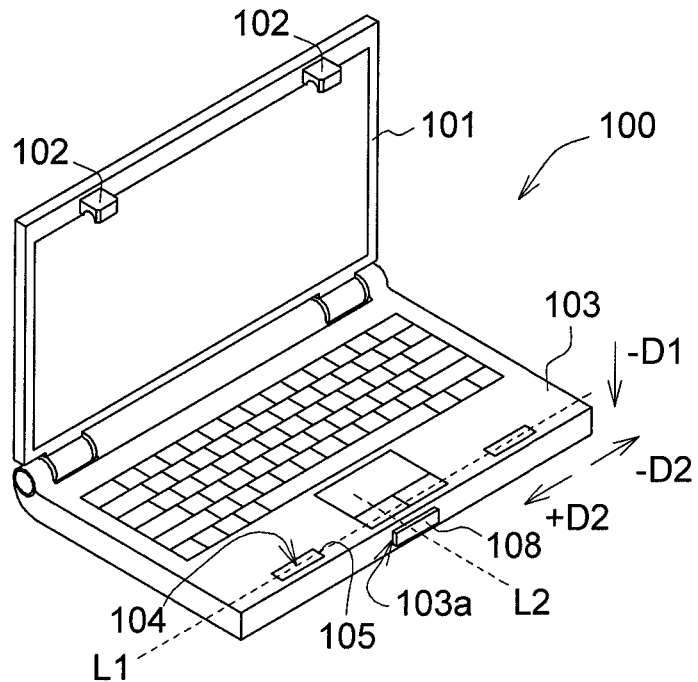
FIGS. 1A and 1B are perspective views showing a notebook computer according to an embodiment of the disclosure.
Figure 1B:
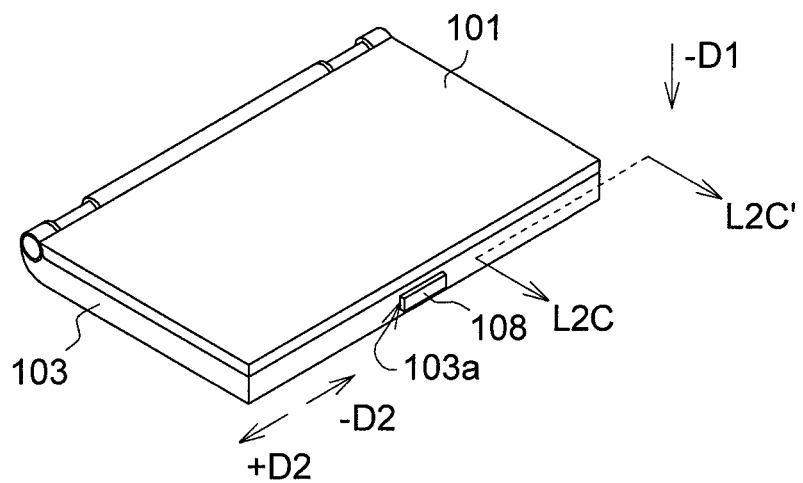

FIGS. 1A and 1B are perspective views showing a notebook computer 100 according to an embodiment of the disclosure. FIG. 1A is a perspective view showing a first machinery 101 of the notebook computer 100, which is opened. FIG. 1B is a perspective view showing the first machinery 101 of the notebook computer 100, which is closed. Referring to FIG. 1A, the notebook computer 100 includes the first machinery 101, a first latch 102, a second machinery 103, a slider 104, an elastic element 107 (to be depicted in FIG. 2C) and a push element 108 (to be depicted in FIG. 3A). The first latch 102 is disposed on an edge of the first machinery 101. As shown in FIG. 1B, the first latch 102 latches the slider 104. The cross-sectional view taken along a line 2C-2C' in FIG. 1B is shown in FIG. 2C. FIG. 2C is a cross-sectional side view showing the first latch 102 latching the slider 104 in the notebook computer 100 according to the embodiment of the disclosure.

As shown in FIG. 2C, the second machinery 103 has one side pivotally connected to the first machinery 101, and the other side formed with at least one latching hole 105. The latching hole 105 is disposed in correspondence with the position of the first latch 102, so that the first latch 102 is inserted into the latching hole 105 when the first machinery 101 and the second machinery 103 are closed relatively to each other. The slider 104 includes a body 104a and a second latch 104b. The body 104a is slidably disposed in a space 106 inside the second machinery 103 along a first moving path L1. The second latch 104b is disposed on the body 104a and suits to latch the first latch 102 or unlatch an interference with the first latch 102. The elastic element 107 has one end connected to the slider 104, and the other end connected to an inner wall of the second machinery 103. The push element 108 (to be depicted in FIG. 3A) is slidably disposed in the second machinery 103 along a second moving path L2 (to be depicted in FIG. 3A) and suits to push the body 104a of the slider 104. When the push element 108 pushes the body 104a of the slider 104, at least one portion of the body 104a is moved away from the first moving path L1, so that the second latch 104b is moved away from the first moving path L1 to unlatch the interference between the second latch 104b and the first latch 102.

The first latch 102 and the first machinery 101 are integrally formed to simplify the manufacturing processes and increase the mechanical strength between the first latch 102 and the first machinery 101. The cross-sectional area of the latching hole 105 parallel to the surface of the second machinery 103 is larger than or equal to the cross-sectional area of the first latch 102 parallel to the surface of the first machinery 101, so that the first latch 102 can be inserted into the latching hole 105. The second latch 104b and the body 104a are integrally formed. The second latch 104b has an inclined surface 104c facing the latching hole 105. The first latch 102 suits to act upon the inclined surface 104c to actuate the slider 104 along the first moving path L1. The deformation direction of the elastic element 107 is parallel to the first moving path L1, for example. The slider 104 is made of a flexible material, for example, and the rigidity of the slider 104 is greater than that of the elastic element 107.

Figure 3A:
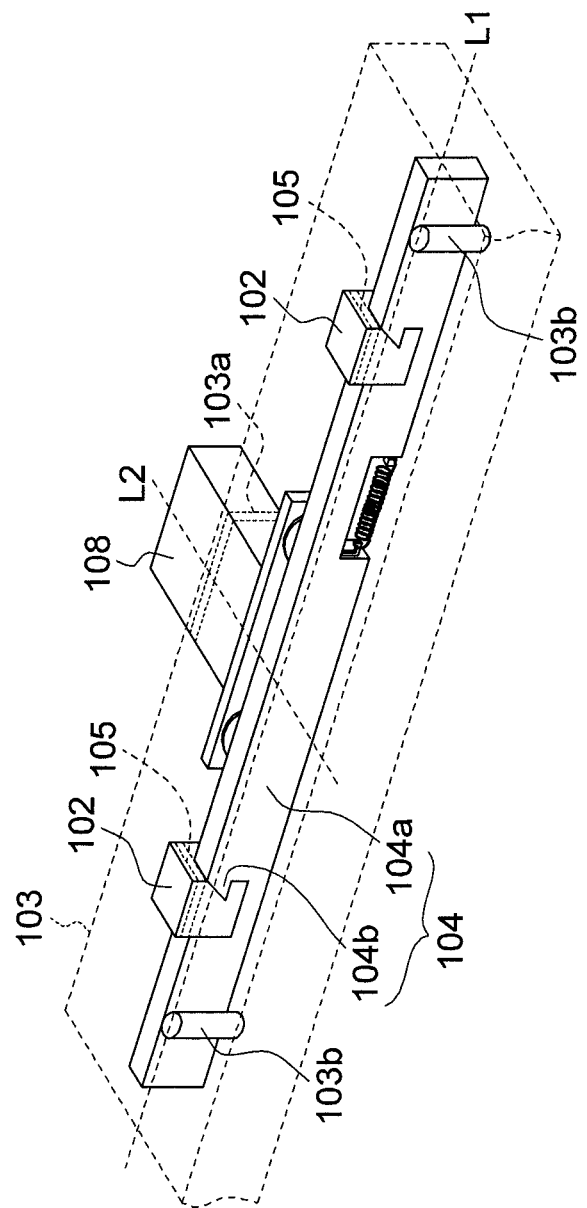
FIGS. 3A to 3C are perspective views showing an interference unlatching process between the first latch and the slider according to the embodiment of the disclosure.

FIG. 3A is a perspective view showing the first latch 102 latching the slider 104 in the notebook computer 100 according to the embodiment of the disclosure. When the push element 108 pushes the body 104a of the slider 104, the body 104a is curved and partially moved away from the first moving path L1. The second machinery 103 has a through hole 103a along the second moving path L2, and the push element 108 is disposed in the through hole 103a. The thickness of the push element 108 is greater than the offset distance of the at least one portion of the body 104a away from the first moving path L1.

The latching process between the first latch 102 and the slider 104 will be illustrated with reference to FIGS. 2A to 2C.

Figure 2A:
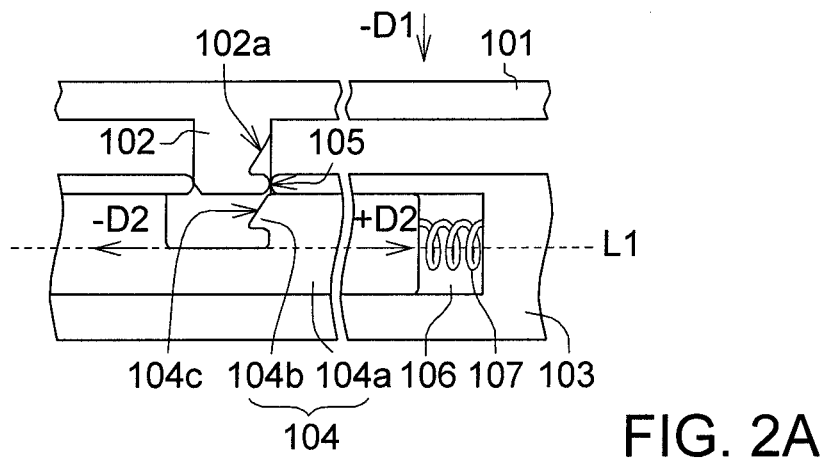
FIGS. 2A to 2C are cross-sectional views showing a latching process between a first latch and a slider according to the embodiment of the disclosure.

As shown in FIG. 2A, when the first machinery 101 and the second machinery 103 have not been closed relatively to each other, the position of the second latch 104b partially overlaps with the position of the latching hole 105. When the first machinery 101 and the second machinery 103 are to be closed relatively to each other, the first latch 102 is inserted into the latching hole 105 of the second machinery 103 along the D1 direction. The second latch 104b has the inclined surface 104c slantingly facing the latching hole 105 to have, for example, the shape of a triangular prism or a trapezoidal prism. Thus, it is possible to let the first latch 102 rest against the inclined surface 104c when the first latch 102 is moved in the −D1 direction, so that the slider 104 (i.e., the second latch 104b and the body 104a connected to the second latch 104b) is moved in the positive direction +D2 of the first moving path L1.

Figure 2B:
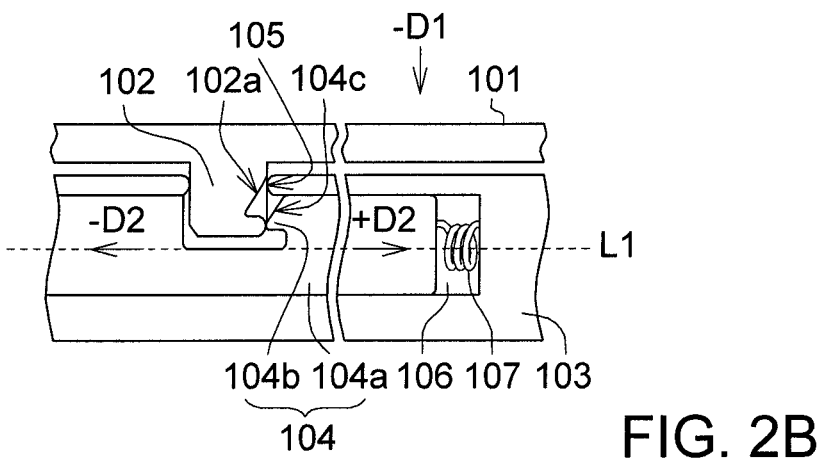
Figure 2C:
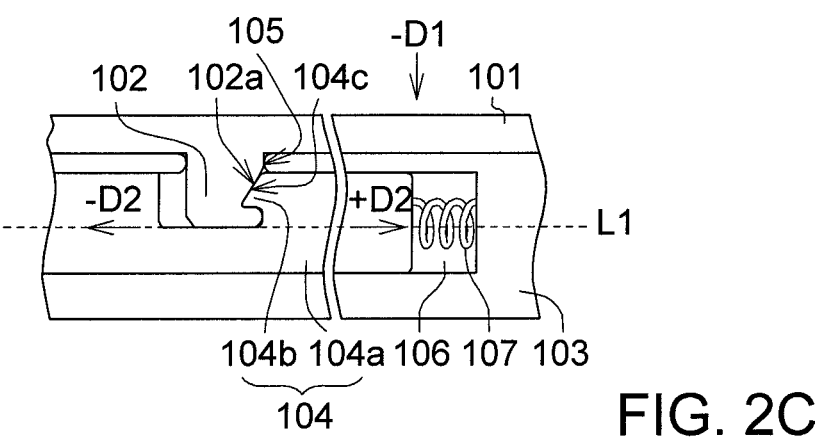

As shown in FIG. 2B, the elastic element 107 deforms as the slider 104 slides in the positive direction +D2 of the first moving path L1 to exert an elastic recovery force on the slider 104 in the negative direction −D2. At this time, the first latch 102 suits to act upon the inclined surface 104c of the second latch 104b, so that the elastic element 107 deforms along the first moving path L1. In this embodiment, the elastic element 107 generates a compressive deformation state along the first moving path L1. At this time, the elastic element 107 of the disclosure is not restricted to the compressive deformation state, and the elastic element 107 may also have a tensile deformation state, for example. The slider 104 slides to the second latch 104b in the positive direction +D2 and is away from the latching hole 105 without overlapping with the latching hole 105. Thus, the first latch 102 can be continuously moved in the −D1 direction.

Referring to FIG. 2C, the first latch 102 further includes a fastening slot 102a, which has a dimension greater than or equal to that of the second latch 104b, so that the second latch 104b of the slider 104 latches the fastening slot 102a of the first latch 102. In FIG. 2B, the first machinery 101 is continuously moved toward the second machinery 103, so that the first latch 102 is continuously moved in the −D1 direction. When the fastening slot 102a of the first latch 102 corresponds to the second latch 104b, as shown in FIG. 2C, the second latch 104b is moved toward the fastening slot 102a because the elastic element 107 exerts the elastic recovery force on the slider 104 in the negative direction −D2. At this time, the second latch 104b of the slider 104 latches the fastening slot 102a of the first latch 102, so that the first machinery 101 is fixed to the second machinery 103.

Figure 3B:
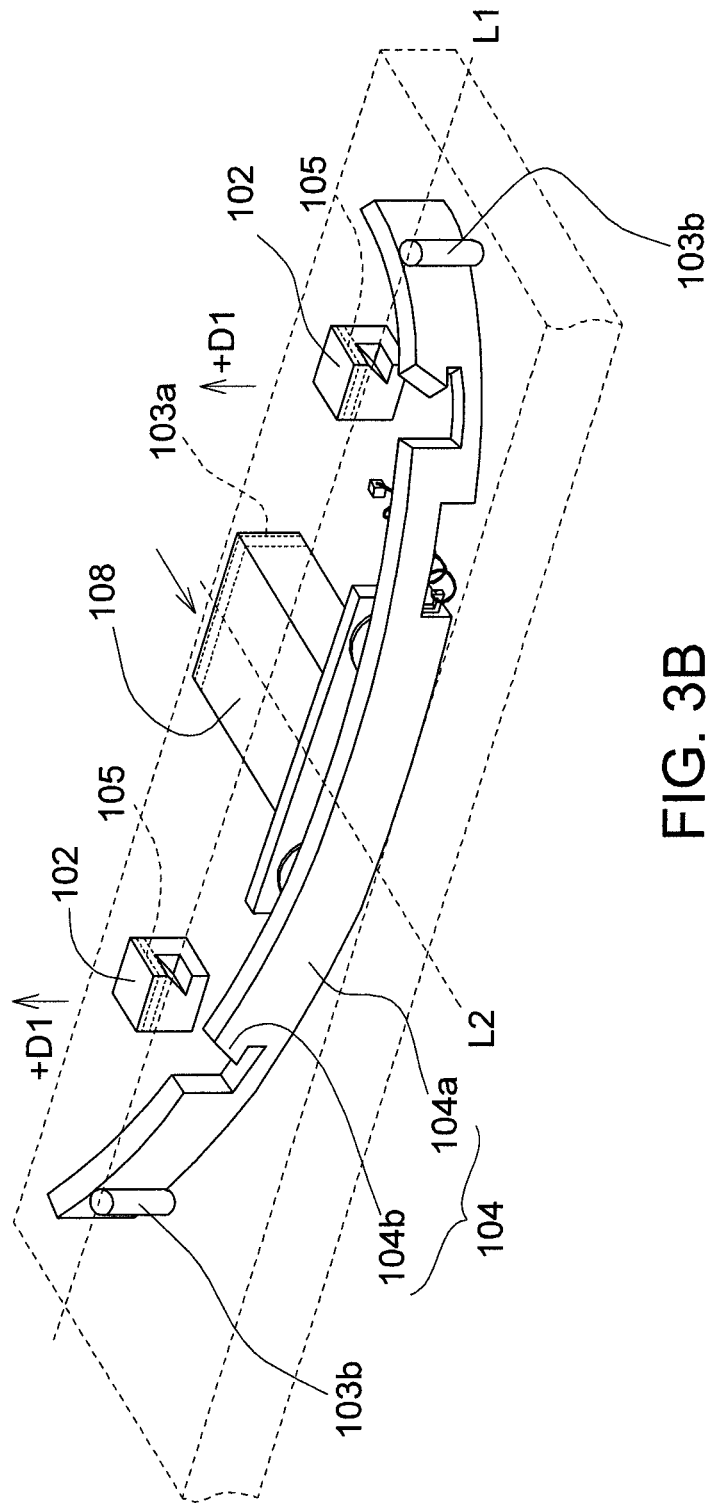

The interference unlatching process of the first latch 102 and the second latch 104b of the slider 104 will be described with reference to FIGS. 3A to 3C.

As shown in FIG. 3A, the first latch 102 latches the second latch 104b. When the unlatching process is to be performed, as shown in FIG. 3B, the push element 108 is pushed so that the push element 108 pushes the body 104a of the slider 104 along the second moving path L2, and the at least one portion of the body 104a is moved away from the first moving path L1.

In this embodiment, the push element 108 is disposed to push the central portion of the body 104a of the slider 104. The second machinery 103 is formed with stopper bodies 103b on two ends of the body 104a of the slider 104. The first moving path L1 is located between a line connecting the two stopper bodies 103b and an inner wall of a casing of the second machinery 103. When the push element 108 pushes the central portion of the body 104a of the slider 104, the stopper bodies 103b press two ends of the body 104a, so that the central portion of the body 104a is moved away from the first moving path L1, and the second latch 104b is moved away from the first moving path L1 to unlatch the interference between the second latch 104b and the first latch 102. At this time, the first latch can be moved, from the latching hole 105, in the +D1 direction away from the second machinery 103.

Figure 3C:
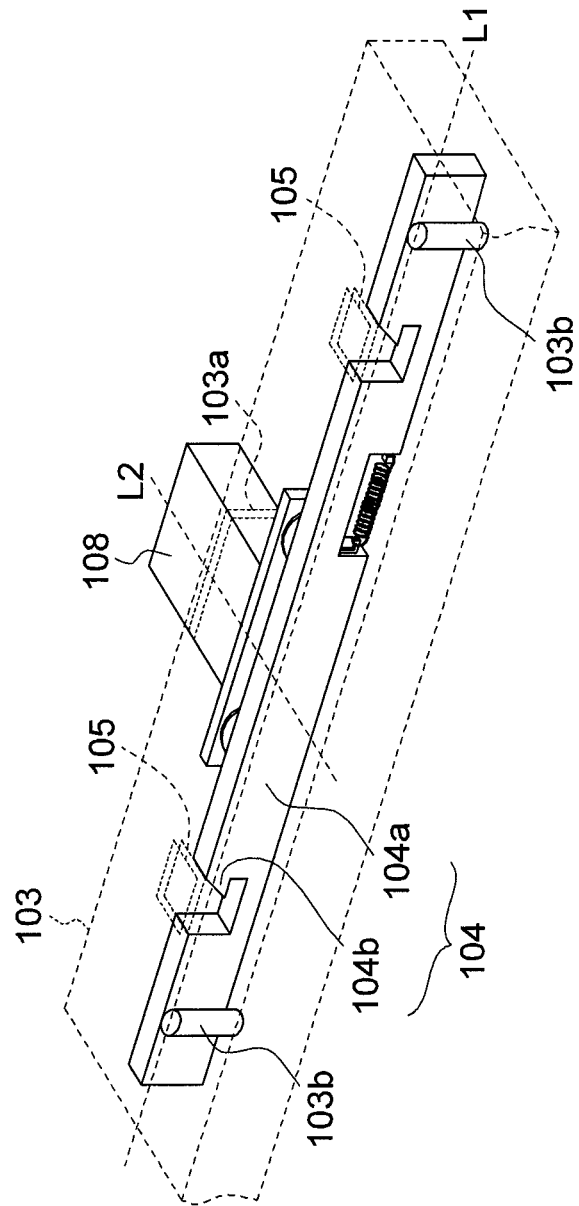

Next, as shown in FIG. 3C, the push element 108 is released, and rigidity of the body 104a recovers the body 104a to the straight shape, so that the push element 108 is moved outside the second machinery 103 along the second moving path L2 to recover to the original position of the push element 108. In addition, the pivot for pivotally connecting the first machinery 101 to the second machinery 103 may also have the elasticity. Thus, when the first latch 102 unlatches the interference with the second latch 104b, the first machinery 101 is automatically rotated in the +D1 direction, so that the first latch 102 is moved in the +D1 direction. Thus, when the first latch 102 is to latch the second latch 104b (see FIG. 3A), the push element 108 is pushed so that the first latch 102 unlatches the interference with the second latch 104b (see FIG. 3B), and the elasticity of the pivot moves the first latch 102 in the +D1 direction, and then the push element 108 can be released (see FIG. 3C). Even if the body 104a of the slider 104 recovers toward the first moving path L1, the second latch 104b cannot latch the first latch 102, so that the first machinery 101 can be rotated away from the second machinery 103.

In this embodiment, as shown in FIG. 2A, the fastening slot 102a may have the shape of the triangular prism or the trapezoidal prism slightly larger than or equal to the second latch 104b. Thus, the second latch 104b can be completely latched into the fastening slot 102a during the latching process.

Figure 4A:
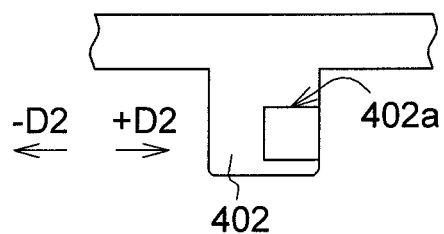
FIGS. 4A and 4B are cross-sectional views showing another aspect of a first latch according to the embodiment of the disclosure.
Figure 4B:
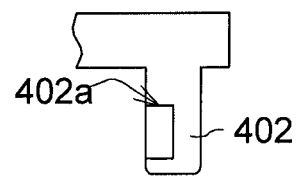

FIGS. 4A and 4B are cross-sectional views showing another aspect of a first latch 402 according to the embodiment of the disclosure. FIG. 4A is a cross-sectional front view showing the first latch 402, and FIG. 4B is a cross-sectional side view showing the first latch 402. As shown in FIGS. 4A and 4B, a fastening slot 402a may have a shape of a rectangular prism encompassing (i.e., larger than) the second latch 104b.

Figure 5A:
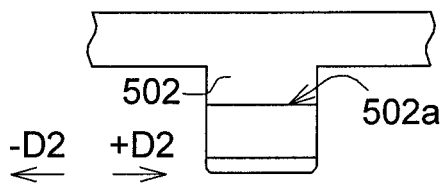
FIGS. 5A and 5B are cross-sectional view showing still another aspect of a first latch according to the embodiment of the disclosure.
Figure 5B:
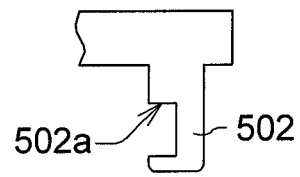

FIGS. 5A and 5B are cross-sectional views showing another aspect of a first latch 502 according to the embodiment of the disclosure. FIG. 5A is a cross-sectional front view showing the first latch 502, and FIG. 5B is a cross-sectional side view showing the first latch 502. As shown FIGS. 5A and 5B, a fastening slot 502a has a grooved shape capable of completely penetrating through a surface of the first latch 502. With such a design, the first latches 402 and 502 can be easily molded.

The embodiment of the disclosure is directed to a notebook computer, in which the first machinery latches the second machinery according to the first latch disposed on the first machinery and the slider disposed on the second machinery. Thus, the first machinery and the second machinery cannot easily get loose, and it is possible to prevent the first machinery from being impacted and thus to protect the fragile display disposed on the first machinery. Furthermore, the body of the slider is slidably disposed in the second machinery but not disposed in the first machinery, and the second machinery generally has the larger space than the first machinery. So, the first machinery can be thinned, so that the overall notebook computer can be thinned.

While the disclosure has been described by way of example and in terms of the embodiment(s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A notebook computer, comprising:
   a first machinery;
   a first latch disposed on an edge of the first machinery;
   a second machinery having one side pivotally connected to the first machinery, and the other side formed with at least one latching hole, wherein when the first machinery and the second machinery are closed relatively to each other, the latching hole corresponds to a position of the first latch, so that the first latch is inserted into the latching hole;
   a slider, comprising:
   a body slidably disposed in the second machinery along a first moving path; and
   a second latch disposed on the body and suiting to latch the first latch or unlatch an interference with the first latch;
   an elastic element having one end connected to the slider, and the other end connected to an inner wall of the second machinery; and
   a push element slidably disposed in the second machinery along a second moving path and suiting to push the body of the slider,
   wherein when the push element pushes the body of the slider, at least one portion of the body is moved away from the first moving path, so that the second latch is moved away from the first moving path to unlatch the interference between the second latch and the first latch.

2. The notebook computer according to claim 1, wherein the second latch has an inclined surface facing the latching hole, and the first latch suits to act upon the inclined surface to actuate the slider along the first moving path.

3. The notebook computer according to claim 1, wherein when the first latch is inserted into the latching hole, the first latch suits to act upon the second latch so that the elastic element deforms along the first moving path.

4. The notebook computer according to claim 3, wherein when the first latch acts upon the second latch, the elastic element generates a compressive deformation state along the first moving path.

5. The notebook computer according to claim 3, wherein when the first latch acts upon the second latch, the elastic element generates a tensile deformation state along the first moving path.

6. The notebook computer according to claim 1, wherein the slider is made of a flexible material, so that the body is curved and partially moved away from the first moving path when the push element pushes the body of the slider.

7. The notebook computer according to claim 6, wherein rigidity of the slider is greater than rigidity of the elastic element.

8. The notebook computer according to claim 1, wherein the second machinery has a through hole along the second moving path, and the push element is disposed in the through hole.

9. The notebook computer according to claim 1, wherein a thickness of the push element is greater than an offset distance of at least one portion of the body away from the first moving path.

10. The notebook computer according to claim 1, wherein the first latch has a fastening slot having a dimension greater than or equal to a dimension of the second latch, so that the slider latches the first latch.

11. The notebook computer according to claim 1, wherein the at least one portion of the body is bended to move away from the first moving path when the push element pushes the body of the slider.

* * * * *